R. F. MacMICHAEL.
GASOLINE GAUGE.
APPLICATION FILED FEB. 16, 1918.
1,406,201. Patented Feb. 14, 1922.
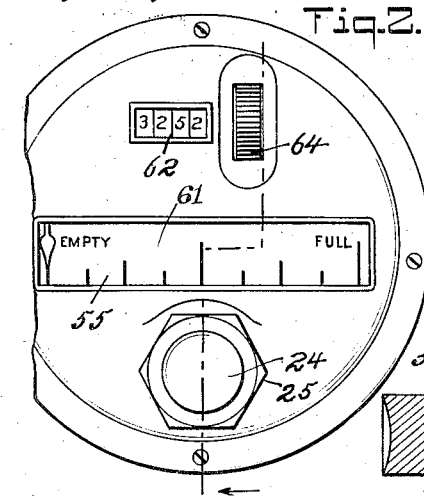
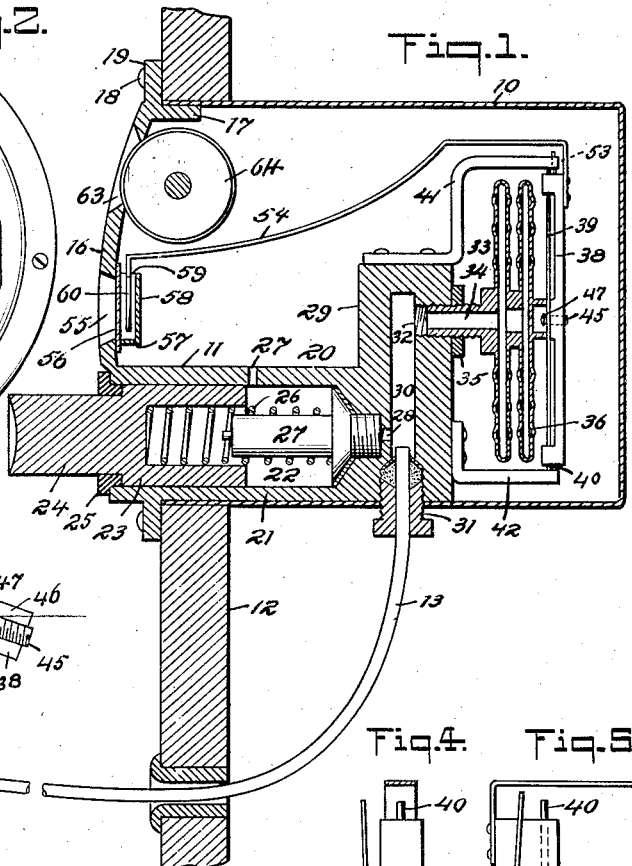
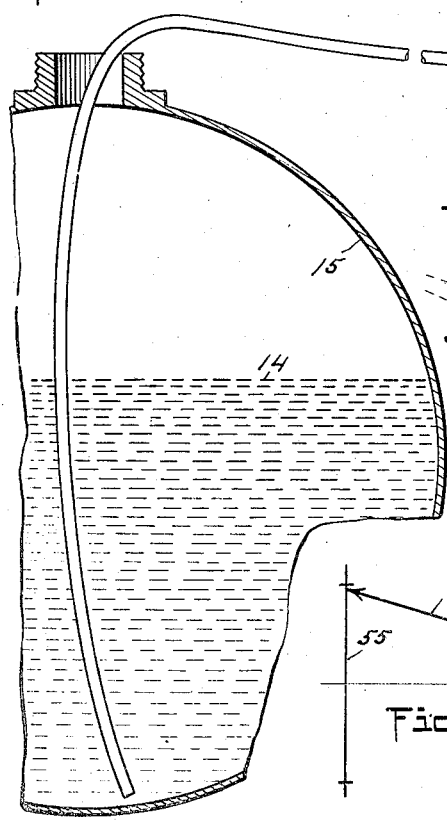
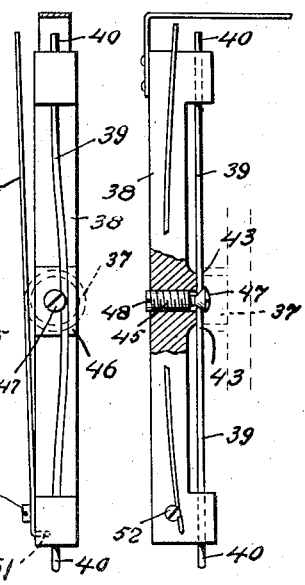
INVENTOR
Ross F. MacMichael
BY
Messimer and Austin.
ATTORNEYS

UNITED STATES PATENT OFFICE.

ROSS F. MacMICHAEL, OF HAYDEN, ARIZONA, ASSIGNOR TO THE G. PIEL COMPANY, INC., OF LONG ISLAND CITY, NEW YORK, A CORPORATION OF NEW YORK.

GASOLINE GAUGE.

1,406,201.          Specification of Letters Patent.      Patented Feb. 14, 1922.

Application filed February 16, 1918. Serial No. 217,672.

*To all whom it may concern:*

Be it known that I, ROSS F. MACMICHAEL, a citizen of the United States, and resident of Hayden, in the county of Gila and State of Arizona, have invented certain new and useful Improvements in Gasoline Gauges, of which the following is a specification.

My invention relates in general to a hydrostatic pressure indicator of the type in which a balanced air pressure is maintained in the indicator by the hydrostatic head of the liquid being measured, which balanced pressure will react on the indicating mechanism of the device to register the depth of the liquid being measured, and the invention specifically relates to such a device designed to constitute an attachment constructed to be mounted on the dash-board of a motor vehicle for the purpose of indicating, at will, the amount of gasoline in the fuel tank.

The primary object of the invention is to provide a simple, compact and easily machined and assembled device of the class described which can be marketed at low cost and which can be readily mounted in position conveniently accessible to the operator.

Another object of the invention is to provide, in a device of the class described, a readily manipulated adjustment for adapting a standardized instrument to different situations and with but one graduated scale to measure the fractions of different liquid depths proportionate to a definite depth.

Another object of the invention is to provide in such an instrument an indicating mechanism which will be sensitive to small variations in the controlling hydrostatic pressure and in which such variations will be readily visible on a relatively large scale.

Various other objects and advantages of the invention will be in part obvious from an inspection of the accompanying drawings and in part will be more fully set forth in the following particular description of one form of mechanism embodying my invention, and the invention also consists in certain new and novel features of construction and combination of parts hereinafter set forth and claimed.

In the drawings:

Figure 1 is a vertical sectional view taken axially through a preferred embodiment of my invention shown mounted in position on a support and operatively connected to a tank containing the liquid to be measured;

Figure 2 is a front elevational view, with parts broken away, of the front of the device shown in Figure 1;

Figure 3 is an enlarged detailed view in side elevation of the pressure controlled device with parts broken away to show the connection thereof with the rocker-bar element of the indicating mechanism;

Figures 4 and 5 are detailed views of the rocker-bar; Figure 4 being a view of the front elevation and Figure 5 being a view in side elevation and oppositely disposed to the showing of this member in Figure 1; and Figures 6 and 7 are diagrammatic views of the connection with the adjustment shown in two extreme positions.

In the drawing there is disclosed a mechanism containing shell 10 in the form of an open front spun metal cylinder and a casting 11 containing the operating mechanism. This casting and its attached parts are removable as a unit from the shell and are sufficiently rugged to withstand all strains to which a device of this character may be subjected. The device is shown mounted in position on a support 12 which, for the purpose of this disclosure, may be considered as the dash-board of an automobile or other structural part which may be subjected to vibration.

A connecting tube 13 leads from the mechanism in the casting 11 and extends to the bottom of a body of liquid 14 positioned in a tank 15. For the purpose of this disclosure the tank may be considered as the fuel tank of an automobile power system and that it may be positioned in any suitable place spaced from the dash-board as is usual in automobile construction. For the purpose of illustrating that the tube 13 may be adjusted to fit any prescribed path between the indicator and the fuel tank, the tube is shown to be flexible. The open front of the casing 10 is closed by means of the casting 11 which includes a front face 16 in the form of a segment of a sphere so as to allow free play to the indicator pointer hereinafter described and at the same time provide an ornamental front to the instrument. An outlining circular flange 17 projects rearwardly from the face 16 and fits telescopically in the shell 10 to reinforce the same. The shell 10 projects through the support 12 which is simply drilled to size to contain the same with a close fit. The device as a whole is mounted on the support 12 and is fastened thereto by means of screws 18 which pass through a circular flange 19. This flange outlines the front 16, and assists to secure the device firmly to the support.

The casting includes an L shaped extension 20 with the forward portion thereof, adjacent the face, constituting a horizontally disposed pump barrel 21 formed integral with the lower portion of the flange 17.

The pump barrel is provided with a pump chamber 22 of relatively large capacity and opening directly from the outside through the lower portion of the face 16. A pump plunger 23 is slidably mounted in the chamber 22 and is provided with a finger piece 24 which projects forwardly beyond the front of the face 16 and is demountably held in position by means of a collar 25 threaded into the countersunk threaded open end of the pump barrel. By means of this construction, ready access is provided to the chamber 22 simply by unscrewing the collar and withdrawing the plunger. A compression spring 26 is housed within this chamber 22 and acts on the plunger 23 to maintain the same in the projected position shown in Figure 1, as is usual in one type of air pump construction. The pump is provided with an intake port 27 and with a valve controlled discharge port 28 and in other respects this part of the device resembles the disclosure in my co-pending application, Serial No. 144,738, filed June 26, 1917. The inner end of the L shaped extension at one end of the pump casing constitutes an upstanding mechanism support 29 provided therein with a T-shaped passageway 30. The laterally extending or stem part of this T passageway constitutes the discharge port 28 from the air compression pump and the other passageway extends vertically and opens at its lower end into the tube 13. This tube is fastened in place by the gland packing 31 accessible from the exterior of the shell 10. The upper rear side of the support 29 is provided with a threaded passageway 32 leading from the upper portion of the passageway 30. A pressure actuated expanding device 33 of the conventional double diaphragm type, is provided with a nipple 34 screw-threaded into the opening 32, movable to and from the support and secured in locked position by means of a lock nut 35. The outer movable diaphragm 36 of this device is provided centrally thereof with a ring 37 which ring has an indicator actuating movement in a direction away from the support 29 and parallel to the axis of the ring and to the axis of movement of the diaphragm.

This support 29 carries an indicating mechanism which includes an upstanding E shaped rocker-bar 38 having an axis of rotation parallel to its length and perpendicular to the axis of movement of the ring 37. The bar is demountably pivoted in position by means of a pivoting wire 39 which has opposite ends projecting beyond the upper and lower ends of the rocker-bar to constitute pivoting pins 40 journalled in brackets 41 and 42 which are fixed to the support 29 and extend rearwardly therefrom to lap the pressure actuating device 33.

The front edge of the rocker bar is cut away between the upper and lower ends thereof to form a space across which extends the central portion of the wire 39 (as shown more particularly in Fig. 4). This central portion of the wire is offset laterally from the axis of rotation of the rocker-bar, so as to provide a point, or rather a pair of points 43, of engagement designed to have the forward edge 44 of the ring 37 contact with the same. The parts are so disposed that the bearing of the ring on the offset portion of the wire will rock the bar about its axis of rotation and over an angle dependent upon the extent of displacement of the ring 37 from its neutral position by the pressure actuated device 33. This connection acts to transform the unilateral movement of the pressure actuated device into rotary movement of the rocker bar.

Means are provided not only to maintain the wire in its offset position but also to adjust the extent to which the points 43 are offset from the axis of rotation thereby forming a variable lever connection between the pressure actuated device and the rocker bar. This adjustment is provided by means of a conical-headed screw 45 adjustably threaded in a central extension 46 in the rocker-bar and the head 47 of which extends into the ring 37. The outer end of the screw is provided with a slot 48 by means of which the position of the head 47 may be readily adjusted relative to the adjacent face 49 of the extension 46 as shown in Figs. 3, 6, and 7. The offset portion of the wire is engaged by the bevel side of the screw head and is so arranged that it is stretched under tension between the head and the extension 46. The rotation of the screw will cause the head to bear on the wire moving the same from an inset position shown in Figure 6 towards the extreme outermost position shown in Figure 7, thus moving the offset portion across the advanced edge 44 of the ring and offsetting the same more and more from the axis of rotation of the bar.

The offset portion of the wire is maintained in light bearing engagement with but mechanically disconnected from the ring 37 by means of a long thin spring 50 which extends lengthwise of the rocker-bar. This spring has one end 51 inturned into the rocker-bar and adjustably fastened thereto by means of the screw 52 and has the other and free end bearing against the upper bracket and fitted in a slot 53 in the outer edge thereof. This spring has a tension sufficiently small to prevent any material resistance to the movement of the ring 37 and sufficiently high to insure the contacting of the rocker-bar and ring under all the jarring conditions to which such a device is subjected when mounted on a vehicle.

A long flexible pointer 54 has one end attached to the side of the rocker bar opposite the side provided with the offset wire, is bent over the upper bracket and extends forwardly over the pump casing towards the front 16.

The front 16 is provided with a long sight opening 55 extending horizontally across the widest part of the front and positioned so as to be conveniently visible to the operator. The opening is closed by means of a strip of transparent material 56 such as mica or celluloid held in place by means of a frame 57 fastened to the rear side of the front 16. The frame includes a rear wall 58 spaced from the mica sheet so as to provide a trough 59 designed to accommodate the depending free end 60 of the pointer 54. The front face of the wall is provided with a scale 61 (see Figure 2) visible through the opening 55 and coacting with the pointer to indicate the pressure condition due to the head of liquid in the tank 15. This scale may be suitably graduated to indicate any desired quantity of the liquid such as volume, depth and the like. In the device illustrated the scale is provided at one side with a zero or "empty" mark; at the other side with a "full" mark and is divided therebetween in fractional marks, to designate the proportion of liquid in the tank relative to the full capacity of the particular tank in use.

In the device disclosed there is provided an indicating dial 62 visible through an opening 63 in the upper portion of the front 16, which dial is actuated by a milled edge finger piece 64 which projects through the front. This indicating mechanism may be used to register the amount of fuel placed in the tank 15 during any predetermined time.

In operation and assuming that the parts are assembled in the position shown in Figure 1, and that is is desired to ascertain the amount of liquid in the tank, the plunger is manually actuated to compress the air trapped in the chamber 22 by the closing of the port 27. During the compression stroke the compressed air is forced past the valve controlling the passageway 28 and into the passageway 30. This actuation of the pump is continued once or twice or until a hydrostatic balance is reached, at which time the surplus air will bubble up through the liquid 14. The hydrostatic head thus established in the submerged portion of the tube 13 will react on the pressure actuated device 33 causing the ring 37 to move outwardly as is usual in devices of this character. The advanced edge 44 of the ring 37 will bear on the offset portion of the wire 39 and acts therethrough to rotate the rocker arm to swing the pointer across the scale 61 thereby to indicate the depth of the liquid in the tank.

When desired, by opening the valve controlled passageway 28, the pressure in the system is released, the diaphragm 36 collapses and the spring 50 acts on the rocker-bar to swing the pointer back to its initial "empty" position.

By adjusting the nipple 34 relative to the rocker-bar while the pressure inside and outside the diaphragm is equal, the pointer may be set accurately at the zero point on the "empty" side of the scale.

Should it be desired to provide a different ratio between the extent of movement of the ring 37 relative to the extent of movement of the pointer across the scale, as when the same manufactured gauge is to be applied to different makes of automobiles with tanks of different depths, the screws 18 are loosened and the front 16 together with the pressure actuated and indicating mechanism is withdrawn bodily from the shell 10. By means of a suitable tool engaging the slot 48 the screw is adjusted in the desired direction to give the necessary change in leverage and thus change the ratio between the pressure actuated and the pressure indicating mechanism. The device is remounted and is again ready for operation under the new ratio condition.

The rocker-bar may be considered as a counterweight for the pointer enabling the device to be used in any position.

Having thus described my invention, I claim:

1. In a device of the class described, the combination of a pressure controlled device having a straight line operating movement in one direction, a pressure indicating mechanism including a pivotally mounted rocking bar in light bearing engagement with and mechanically disconnected from said device, an indicating pointer operatively connected so as to be actuated by the rocking of said bar and adjustable means disposed between the pressure controlled device and said rocker-bar for transmitting the operating movement of said device to said bar thereby to cause the bar to rock and thus actuate the pointer said pressure controlled means being free to move away from said adjustable means without drawing said adjustable means with the pressure controlled means.

2. In a device of the class described, the combination of a pressure controlled device including a bearing member, normally inoperative and having an operating movement in one direction, a pressure indicating mechanism including a pivotally mounted rocker bar in light bearing engagement with and mechanically disconnected from said device, an indicating pointer fixed to said rocker bar so as to be actuated by the rocking of said bar, means attached to the rocker-bar and having a point of engagement on one side thereof and offset from the axis of rotation thereof and positioned in the path of movement of said bearing member thereby to be engaged by said bearing member in its actuating movement and moved thereby to rock the bar and thus actuate the pointer.

3. In a device of the class described, the combination of a pressure controlled device including a bar engaging member having an operating movement in one direction, a pressure indicating mechanism including a pivotally mounted rocker-bar disposed entirely in advance of said device, an indicating pointer actuated by the rocking of said bar, and a leverage device fixed to said bar positioned to one side of the bar-engaging member and having a point of engagement on one side thereof and offset from the axis of rotation of said bar, said point adapted to be engaged by said member to rock the bar.

4. In a device of the class described, the combination of a pressure controlled device having an operating movement in one direction, a pressure indicating mechanism finely adjustable means for adjusting said point of engagement relative to pointer actuated by the rocking of said bar, a leverage device fixed to said bar and having a point of engagement offset from the axis of rotation of said bar, said point adapted to be engaged by said device to rock the bar, and microscopically adjustable means for adjusting said point of engagement relative to said axis of rotation thereby to vary the leverage effect of said device on said rocker bar.

5. In a device of the class described, the combination with a ring having an exposed bearing edge and pressure controlled means for moving the ring substantially parallel to its axis, of a pressure indicating mechanism including a rocker-bar having an axis of rotation at right angles to the axis of the ring, and disposed in advance of the ring a leverage device attached to the rocker-bar and adapted to be engaged by the exposed bearing edge of said ring to rock the bar and adjustable means for setting the leverage device to control the distance between the point of engagement of the ring and the axis of rotation of the bar.

6. In a device of the class described, the combination with a ring and pressure controlled means for moving the ring substantially parallel to its axis, of a pressure indicating mechanism including a rocker-bar having an axis of rotation at right angles to the axis of the ring and a spring wire fixed to the rocker bar with a portion thereof offset from the axis of rotation of the bar and adapted to be engaged by the advance edge of the ring to move the bar.

7. In a device of the class described, the combination with a ring and pressure controlled means for moving the ring substantially parallel to its axis, of a pressure indicating mechanism including a rocker-bar having an axis of rotation at right angles to the axis of the ring, a spring wire fixed to the rocker bar with a portion thereof offset from the axis of rotation of the bar and adapted to be engaged by the advance edge of the ring to move the bar, and means engaging said wire for adjusting the offset portion relative to the axis of rotation of the bar.

8. In a device of the class described, the combination with a pressure controlled mechanism including a movable member, a rocker bar positioned in advance of said member, a wire having opposite ends projecting beyond the bar and constituting pins for pivotally mounting the bar, the middle portion of the wire being offset from the axis of rotation of the bar, said offset portion being in the path of movement of the movable member and adapted to be engaged thereby to rock the bar and means for holding the offset portion in position.

9. In a device of the class described, the combination with a pressure controlled mechanism including a movable member, a rocker bar positioned in advance of said member, a wire having opposite ends projecting beyond the bar and constituting pins for pivotally mounting the bar, the middle portion of the wire being offset from the axis of rotation of the bar, said offset portion being in the path of movement of the movable member and adapted to be engaged thereby to rock the bar and a set screw provided with a wire engaging part adapted to bear on the offset portion of the wire to move the same away from the axis of rotation of the bar.

10. In a device of the class described, the combination with a pressure actuated device including a member having a relatively small movement, of an indicating mechanism including a rocker-bar mounted in advance of said movable member, resilient means acting on said bar for moving the same into engagement with said member, said rocker bar engaged by said member at a point offset from the axis of rotation of the bar.

11. In a device of the class described, the combination with a pressure actuated device including a member having a relatively small movement, of an indicating mechanism including a rocker-bar pivotally mounted in advance of said movable member and including a wire offset from the axis of rotation of the rock-bar and adapted to be engaged by said member at a point offset from the axis of rotation of the bar, a scale, a relatively long pointer fixed to said bar and movable over said scale to multiply thereon the movement of said member and means engaging the wire for varying the ratio of the movement of said member to the movement of the pointer across the scale.

12. In a device of the class described, the combination of a mechanism containing casing including a front wall provided with a sight opening, an air pump positioned in said casing, and provided with a finger piece projecting through said front wall adjacent the sight opening, a pressure actuated device supported from said pump and an indicating mechanism supported from said pump and actuated by said device, said indicating mechanism including a pointer visible through said sight opening.

13. In a device of the class described, the combination of a mechanism containing shell, a casting closing one end of said shell, said casting including an air compression pump operable from a position exterior of the shell, a pressure actuated device mounted in said shell and actuated by the pressure generated by said pump and an indicating mechanism actuated by said device for indicating a pressure condition in said device.

14. An article of manufacture comprising a spun metal cylindrical shell, a casting for closing one end of said shell, said casting provided with a sight opening extending therethrough, an indicating mechanism including a pointer visible through said sight opening, and a pressure actuated device mounted in said shell and operatively connected to the indicating mechanism to actuate the pointer.

15. An article of manufacture comprising a spun metal cylindrical shell, a casting for closing one end of said shell, said casting provided with a sight opening extending therethrough, an indicating mechanism including a pointer visible through said sight opening, a pressure actuated device mounted in said shell and operatively connected to the indicating mechanism to actuate the pointer, said shell provided with means for connecting a pressure tube to said pressure actuated device.

16. An article of manufacture comprising a cylindrical shell, a casting for closing one end of said shell, said casting provided with a sight opening extending therethrough, a transparent plate covering said opening, an indicating mechanism including a pointer visible through said covered sight opening, a pressure actuated device mounted on said shell and operatively connected to the indicating mechanism to actuate the pointer, said shell provided with means for connecting a pressure tube to said pressure actuated device and means contained in said shell for generating a pressure in said pressure actuated device.

17. In a device of the class described, the combination of an indicating mechanism, an E-shaped rocker-bar provided with pivotal mountings at opposite ends and a pointer having a prescribed maximum extent of movement from its normal position, a pressure actuated device operatively connected to said indicating mechanism to rotate the rocker-bar on its pivotal mounting and thus move the pointer, a pressure conveying tube open to said device and adjustable means carried by the rocker arm for varying the ratio of the the movement of said device to the movement of the pointer.

18. In a device of the class described, the combination with a mechanism enclosing shell of an indicating mechanism mounted in said shell and including a pointer having a prescribed maximum extent of movement from its normal position, a pressure actuated device operatively connected to said indicating mechanism to move the pointer, a pressure conveying tube open to said device, adjustable means within the shell for varying the ratio of the movement of said device to the movement of the pointer and means within the shell and accessible from the outside thereof for creating a variable pressure in said pressure actuated device and in said tube thereby causing the pointer to move variable distances from its normal position.

19. In a device of the class described, the combination of an indicating mechanism including a pointer having a prescribed maximum extent of movement from its normal position, a pressure actuated device in light bearing engagement with said indicating mechanism to move the pointer, a pressure conveying tube open to said device, adjustable means for varying the ratio of the movement of said device to the movement of the pointer, means for creating a variable pressure in said pressure actuated device and in said tube thereby causing the pointer to move variable distances from its normal position and resilient means for returning said pointer to its normal position when free of the pressure in said device and tube and for causing the part of the indicating mechanisms engaged by said pressure actuated device to follow said device in its movement away from the indicating mechanisms.

Signed at Hayden in the county of Gila and State of Arizona, this 19 day of January, A. D. 1918.

ROSS F. MacMICHAEL.

Witnesses:
 THEO. R. LINGLE,
 J. H. VAN.